United States Patent
Oishi

(10) Patent No.: US 11,242,457 B2
(45) Date of Patent: Feb. 8, 2022

(54) MILLABLE SILICONE RUBBER COMPOSITION AND ELECTRIC-FIELD RELAXATION LAYER

(71) Applicant: SHIN-ETSU CHEMICAL CO., LTD., Tokyo (JP)

(72) Inventor: Kazuhiro Oishi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 42 days.

(21) Appl. No.: 16/643,946

(22) PCT Filed: Jul. 3, 2018

(86) PCT No.: PCT/JP2018/025226
§ 371 (c)(1),
(2) Date: Mar. 3, 2020

(87) PCT Pub. No.: WO2019/077811
PCT Pub. Date: Apr. 25, 2019

(65) Prior Publication Data
US 2020/0407559 A1    Dec. 31, 2020

(30) Foreign Application Priority Data

Oct. 17, 2017 (JP) .............................. JP2017-201163

(51) Int. Cl.
| | | |
|---|---|---|
| *C08G 77/12* | (2006.01) | |
| *C08L 83/04* | (2006.01) | |
| *C08G 77/08* | (2006.01) | |
| *C08G 77/20* | (2006.01) | |
| *C08K 3/04* | (2006.01) | |
| *C08K 3/36* | (2006.01) | |

(52) U.S. Cl.
CPC .............. *C08L 83/04* (2013.01); *C08G 77/08* (2013.01); *C08G 77/12* (2013.01); *C08G 77/20* (2013.01); *C08K 3/04* (2013.01); *C08K 3/36* (2013.01); *C08K 2201/003* (2013.01); *C08K 2201/006* (2013.01); *C08L 2203/202* (2013.01); *C08L 2205/02* (2013.01)

(58) Field of Classification Search
CPC ......... C08G 77/12; C08G 77/20; C08L 83/04; C08L 2205/025; C08K 3/36; C08K 3/04; B01J 23/40; H02G 15/103
See application file for complete search history.

(56) References Cited

U.S. PATENT DOCUMENTS

| | | | |
|---|---|---|---|
| 4,868,063 A | 9/1989 | Okamura et al. | |
| 5,668,205 A | 9/1997 | Yoshida et al. | |
| 2014/0296387 A1 | 10/2014 | Matsukura et al. | |
| 2016/0122611 A1* | 5/2016 | Yoshida | .................. C08L 83/04 |
| | | | 252/75 |
| 2017/0081499 A1 | 3/2017 | Hotta et al. | |

FOREIGN PATENT DOCUMENTS

| | | | |
|---|---|---|---|
| EP | 2 495 285 A1 | 9/2012 | |
| JP | 63-356 A | 1/1988 | |
| JP | 63-28983 A | 2/1988 | |
| JP | 8-22716 A | 1/1996 | |
| JP | 8-41348 A | 2/1996 | |
| JP | 11-140797 A | 5/1999 | |
| JP | 2011-116955 A | 6/2011 | |
| JP | 2013-177558 A | 9/2013 | |
| JP | 2015-57763 A | 3/2015 | |
| JP | 2015-76168 A | 4/2015 | |
| JP | 2015-153514 A | 8/2015 | |
| JP | 2017-2218 A | 1/2017 | |
| JP | 2017-57307 A | 3/2017 | |

OTHER PUBLICATIONS

International Search Report for PCT/JP2018/025226 dated Oct. 9, 2018.
Written Opinion of the International Searching Authority for PCT/JP2018/025226 (PCT/ISA/237) dated Oct. 9, 2018.

* cited by examiner

*Primary Examiner* — Kuo Liang Peng

(57) ABSTRACT

The present invention provides a millable silicone rubber composition characterized by comprising: (A) two raw alkenylated organopolysiloxane rubbers (A-1) and (A-2), i.e., a raw organopolysiloxane rubber including a molecular chain which is represented by a specific empirical formula and in which each of both terminals has been blocked with a trialkenylsiloxy group and a raw organopolysiloxane rubber including a molecular chain which is represented by a specific empirical formula and in which each of both terminals has been blocked with a monoalkenyldialkylsiloxy group; (B) an organohydrogenpolysiloxane having at least two silicon-atom-bonded hydrogen atoms in the molecule; (C) carbon black having an average primary-particle diameter of 100-350 nm; (D) reinforcing fumed silica having a specific surface area, as determined by the BET adsorption method, of 50 m²/g or greater; and (E) a platinum-group metal catalyst. This millable silicone rubber composition has an excellent electric-field relaxation ability, a high elongation at break, a reduced tension set, and high dielectric or insulating properties.

5 Claims, No Drawings

MILLABLE SILICONE RUBBER COMPOSITION AND ELECTRIC-FIELD RELAXATION LAYER

TECHNICAL FIELD

The present invention relates to a millable silicone rubber composition that can be used in, for example, an electric field relaxation layer at intermediate joints and terminations on power cables, and to an electric field relaxation layer.

BACKGROUND ART

When a CV cable (crosslinked polyethylene-insulated PVC-sheathed cable) is connected between CV cables or to a transformer, overhead line or the like, the outer semiconducting layer at the ends of the CV cable must be removed to a certain length. However, when the outer semiconducting layer is simply removed, the electric field concentrates at the end of the outer semiconducting layer, resulting in a loss of electrical characteristics. In order to relax or suppress this electric field concentration, an electric field relaxation layer made of a dielectric material having a dielectric constant that is higher than that of the cable insulation is provided on the cut and stripped portion of the cable shield layer. This makes use of the principle that equipotential lines and electric stress refract when passing through substances of differing dielectric constants (Patent Document 1: JP-A 2015-153514).

Rubber compositions having an increased dielectric constant that can be used in such an electric field relaxation layer are exemplified by compositions which include a polyolefin, ethylene-propylene rubber, ethylene-propylene-diene copolymer, acrylic rubber or nitrile rubber as the base polymer, and include also a high-dielectric substance such as a dielectric ceramic (e.g., a metal oxide, barium titanate) or carbon black (Patent Document 2: 2017-002218). Also, cable ends are often exposed outdoors, and so high-dielectric materials obtained by including a high-dielectric substance in a silicone rubber of excellent weather resistance have been developed (Patent Document 3: JP-A 2013-177558). In addition, a high-dielectric tape which is obtained by forming a high-dielectric rubber into a tape and imparts an airtight, contamination-resisting performance to the power cable terminal structure has been developed (Patent Document 4: JP-A 2015-076168).

Pi (π) electron transfer-type conductive substances such as carbon black and carbon fibers are often used as conductivity-imparting materials to increase the dielectric constant of rubber materials used in such applications. However, when ordinary carbon black is used, it is known that the current-voltage relationship does not obey Ohm's law and becomes nonlinear on account of a tunneling effect due to the carbon structure. Therefore, in electrical power applications such as electrical field relaxation materials at power cable joints and terminations where resistance control is required, when the choice of carbon black and the method of dispersing the carbon black are not suitable, contact between carbon structures readily arises, making it difficult to maintain the insulating properties owing to nonlinearity between the current and the voltage.

In high-dielectric materials containing carbon black (Patent Document 5: JP-A H08-22716), a somewhat high carbon black loading is needed in order to increase the dielectric constant. For this reason, sufficient insulating properties cannot be maintained and so the material becomes electrically conductive or semiconductive. In particular, silicone rubber compositions loaded with thermal black and/or furnace black of a specific particle size and specific DBP oil absorption are described, but the cured rubbers obtained from such compositions are semiconductive.

When the loading of a conductivity-imparting material is increased, the dielectric loss tangent—an important requisite property of the electric field relaxation layer—rises, the dielectric breakdown strength (breakdown voltage, BDV) drops and the reliability decreases. Silicone rubber compositions which include a conductivity-imparting material in a silicone rubber as the base so as to bring the dielectric loss tangent down to 0.1 or below have been described (Patent Document 3: JP-A 2013-177558; Patent Document 6: JP-A 2011-116955), but no data whatsoever has been provided on their dielectric breakdown strength (BDV).

Certain problems arise when working on intermediate joints and terminations between an electric cable end and a terminal fitting which use an electric field relaxation layer. Such problems include, depending on the power cable connection method, the inclusion during work on the cable joint of air pockets that can become a cause of dielectric breakdown, variability in characteristics owing to individual differences among workers, and the fact that insertion takes time. Recently, in outer electrically insulating members, use has been made of the cold shrink method of assembly which involves the prior insertion of a core into an electrically insulating enclosure so as to maintain the inside of the enclosure in a dilated state, movement of the enclosure in the core-dilated state to the power cable joint, and then withdrawing the core so as to allow the enclosure to shrink. This method is currently the method of choice because it is easy to work with and minimizes variability due to individual differences among workers.

Because the rubber material used in a cold shrink enclosure must be easily dilatable and must also have restorability when the core is removed, not only electrical characteristics but also rubber strength is required. Specifically, a material that has a large elongation at break and a small tensile set is needed.

The rubber properties required are the following specific target values as measured by the method described in JIS K 6249:2003: an elongation at break of at least 450%; and a tensile set, measured under test conditions of 180° C., 22 hours and 100% extension, of 20% or less.

A conductive silicone rubber composed of silicone rubber containing a small amount (25 parts by weight or less) of carbon black has been reported as a cold shrink-insertable electric field relaxation layer (Patent Document 7: JP-A 2015-057763). However, there have been no reports whatsoever on high-dielectric insulating rubber materials that have high insulating properties.

PRIOR ART DOCUMENTS

Patent Documents

Patent Document 1: JP-A 2015-153514
Patent Document 2: JP-A 2017-2218
Patent Document 3: JP-A 2013-177558
Patent Document 4: JP-A 2015-76168
Patent Document 5: JP-A H08-22716
Patent Document 6: JP-A 2011-116955
Patent Document 7: JP-A 2015-57763

SUMMARY OF INVENTION

Technical Problem

The present invention was arrived at in light of the above circumstances. An object of this invention is to provide a high dielectric insulating millable silicone rubber composition which has an excellent electric field relaxation ability, a large elongation at break, a small tensile set and a high reliability. Another object is to provide, at an intermediate joint or termination on a power cable, an electric field relaxation layer made of a cured form of the silicone rubber composition.

Solution to Problem

The inventor has conducted extensive investigations in order to achieve these objects and has discovered as a result the following. By using an addition-curable millable silicone rubber composition which includes, as organopolysiloxanes, (A-1) an organopolysiloxane gum which is capped at both ends of the molecular chain with trialkenylorganosiloxy groups and has an alkenyl group content of 0.25 mol % or less and (A-2) an organopolysiloxane gum which is capped at both ends of the molecular chain with monoalkenyldialkylorganosiloxy groups and has an alkenyl group content of from 0.001 to 2 mol %, (B) an organohydrogenpolysiloxane, (C) carbon black, (D) reinforcing fumed silica and (E) a platinum family metal catalyst, and by having the cured silicone rubber obtained by curing this composition satisfy the following properties: a dielectric constant of 10 or more, a dielectric loss tangent of 0.1 or less, a volume resistivity of from $1.0 \times 10^{13}$ to $1.0 \times 10^{17}$ Ω·cm, a dielectric breakdown strength (BDV) of 7 kV/mm or more and, as measured by the methods described in JIS K 6249:2003, an elongation at break of at least 450% and a tensile set, measured under test conditions of 180° C., 22 hours and 100% extension, of 20% or less, the cured composition is suitable as a voltage cable-grade cold shrink rubber member for use as an electric field relaxation layer that can be inserted by the cold shrink method in cable joints such as intermediate joints and terminations in power cables. This discovery ultimately led to the present invention.

Accordingly, the invention provides the following high dielectric insulating millable silicone rubber composition and cold shrink-insertable electric field relaxation layer.
1. A millable silicone rubber composition which includes:
  (A) an alkenyl group-containing organopolysiloxane gum consisting of components (A-1) and (A-2) below in a total amount of 100 parts by weight
    (A-1) 10 to 100 parts by weight of an organopolysiloxane gum of average compositional formula (1) below which is capped at both ends of the molecular chain with trialkenylsiloxy groups and has an alkenyl group content of 0.25 mol % or less

[Chem. 1]

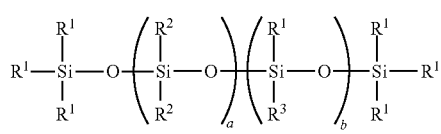

(wherein each $R^1$ is a like or unlike alkenyl group of 2 to 8 carbon atoms, each $R^2$ is a like or unlike group selected from the group consisting of alkyl groups of 1 to 20 carbon atoms and aromatic hydrocarbon groups of 6 to 20 carbon atoms, each $R^3$ is a like or unlike group selected from $R^1$ and $R^2$, the subscript "a" is an integer from 100 to 100,000, the subscript "b" is an integer from 1 to 10, and the sum a+b is from 101 to 100,000)

(A-2) from 0 to 90 parts by weight of an organopolysiloxane gum of average compositional formula (2) below which is capped at both ends of the molecular chain with monoalkenyldialkylsiloxy groups and has an alkenyl group content of from 0.001 to 10 mol %

[Chem. 2]

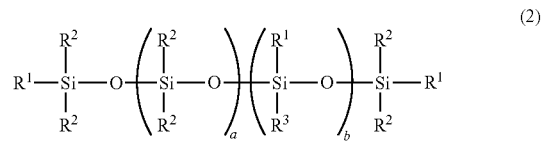

(wherein $R^1$, $R^2$ and $R^3$ are the same as above, the subscript "a" is an integer from 100 to 100,000, the integer "b" is an integer from 0 to 1,000, and the sum a+b is from 100 to 100,000);
  (B) an organohydrogenpolysiloxane of average compositional formula (3) below which has at least two silicon-bonded hydrogen atoms per molecule $$R^4{}_p H_q SiO_{(4-p-q)/2} \qquad (3)$$

(wherein each $R^4$ is a like or unlike monovalent hydrocarbon group of 1 to 12 carbon atoms, and p and q are positive numbers which satisfy the conditions 0<p<3, 0<q≤3 and 0<p+q≤3), in an amount corresponding to from 0.5 to 10 moles of hydrosilyl groups in component (B) per mole of the total amount of alkenyl groups in component (A);
  (C) from 50 to 100 parts by weight of carbon black having an average primary particle size of from 100 to 350 nm;
  (D) from 5 to 100 parts by weight of a reinforcing fumed silica having a specific surface area as measured by the BET adsorption method of at least 50 m²g; and
  (E) a platinum family metal catalyst in an amount, based on the weight of the platinum family metal, of from 1 ppm by weight to 1 wt % relative to the organopolysiloxane of component (A).
2. The millable silicone rubber composition of 1 above, wherein the carbon black (C) has a DBP oil absorption of from 30 to 60 mL/100 g.
3. The millable silicone rubber composition of 1 or 2 above, wherein component (D) is a hydrophobic fumed silica.
4. The millable silicone rubber composition of any of 1 to 3 above which, in a cured form thereof, may be used as a cold-shrink rubber member for voltage cables.
5. An electric field relaxation layer in a power cable intermediate joint or termination, which layer includes a cured form of the millable silicone rubber composition of any of 1 to 4 above, the cured form having, as measured by the methods described in JIS K 6249:2003, a dielectric constant of at least 10, a volume resistivity of from $1.0 \times 10^{13}$ to $1.0 \times 10^{17}$ Ω·cm, a dielectric loss tangent of 0.1 or less, a dielectric breakdown strength (BDV) of 7 kV/mm or more, an elongation at break of at least 450% and a tensile set, measured under test conditions of 180° C., 22 hours and 100% extension, of 20% or less.

Advantageous Effects of Invention

This invention provides a high dielectric insulating millable silicone rubber composition having an excellent electric field relaxation ability, a large elongation at break, a small tensile set and a high reliability, which composition is useful as a cold-shrink rubber member for voltage cables. The cured form thereof is especially useful as a high dielectric field relaxation layer in power cable intermediate joints and terminations.

DESCRIPTION OF EMBODIMENTS

The invention is described more fully below.

In this invention, the specific surface areas of the carbon black and the reinforcing filler are values measured by the BET adsorption method. "Millable silicone rubber composition" refers herein to a silicone rubber composition which at room temperature (25° C.) is generally in a highly viscous non-liquid state that is not self-flowing and which can be uniformly kneaded under shear stress with a mixing apparatus such as a roll mill (e.g., a two-roll mill or three-roll mill). "Organopolysiloxane gum" refers to an organopolysiloxane ingredient which has a high degree of polymerization (high viscosity) of from 100 to 100,000 and which at room temperature (25° C.) is generally in a non-liquid state that is not self-flowing.

The silicone rubber composition of the invention includes components (A), (B), (C), (D) and (E).

[(A) Alkenyl Group-Containing Organopolysiloxane Gum]

The alkenyl group-containing organopolysiloxane gum (A) serves as the base polymer of the composition, and is an organopolysiloxane consisting of components (A-1) and (A-2) below having differing molecular chain end structures and alkenyl group contents. In this invention, the alkenyl group contents are values computed from the integration ratios measured by $^1$H-NMR spectroscopy under the following conditions.

[Measurement Conditions]
Measurement frequency: 400 MHz
Measurement sample: 25 wt % solutions of the polysiloxane in heavy chloroform were used
Internal standard: chloroform (A-1) Trialkenyl Di-Terminated Organopolysiloxane Gum The trialkenyl group-terminated organopolysiloxane gum of component (A-1) has the following average compositional formula (1).

[Chem. 3]

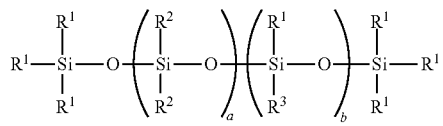

(1)

In formula (1), each $R^1$ is independently an alkenyl group of 2 to 8, and preferably 2 to 6, carbon atoms. Examples of $R^1$ include vinyl, allyl, butenyl and hexenyl groups. Of these, vinyl, and allyl groups are preferred, and vinyl groups are more preferred. $R^2$ is a group selected from alkyl groups of 1 to 20, preferably 1 to 12, and more preferably 1 to 8, carbon atoms and aromatic hydrocarbon groups of 6 to 20, and preferably 6 to 12, carbon atoms. Examples of the alkyl groups of $R^2$ include alkyl groups such as methyl, ethyl, propyl and butyl groups, and cycloalkyl groups such as the cyclohexyl group; examples of the aromatic hydrocarbon groups include aryl groups such as phenyl and tolyl groups, and aralkyl groups such as the β-phenylpropyl group. Some or all hydrogen atoms bonded to carbon atoms on these groups may be substituted with halogen atoms; such substituted groups are exemplified by the 3,3,3-trifluoropropyl group. Of these, methyl, phenyl and trifluoropropyl groups are preferred, and methyl groups are more preferred. $R^3$ is a group selected from $R^1$ and $R^2$, and is exemplified by the groups mentioned above as examples of $R^1$ and $R^2$. Of these, an organopolysiloxane in which preferably at least 50 mol %, and more preferably at least 80 mol %, of the monovalent hydrocarbon groups represented by $R^2$ and $R^3$ on the molecule are methyl groups and all $R^2$ and $R^3$ groups other than alkenyl groups are methyl groups is especially preferred.

In formula (1), the subscript "a" is an integer from 100 to 100,000, and preferably from 1,000 to 50,000; the subscript "b" is an integer from 1 to 10, and preferably from 1 to 6; and a+b is from 101 to 100,000, preferably from 1,000 to 50,000, and more preferably from 2,000 to 20,000. When a+b is within this range, component (A-1) is a gum and can be advantageously used in this invention.

Also, component (A-1) is an organopolysiloxane having an alkenyl group content of 0.25 mol % or less, and preferably from 0.10 to 0.25 mol %.

The organopolysiloxane of component (A-1) is not particularly limited so long as it satisfies the condition for the amount of alkenyl groups per molecule, although a linear diorganopolysiloxane in which the main chain is made up of recurring diorganosiloxane units (here and below, $R^2{}_2SiO_{2/2}$, wherein $R^2$ is the same as above) and both ends of the molecular chain are capped with trialkenylsiloxy groups (here and below, $R^1{}_3SiO_{1/2}$, wherein $R^1$ is the same as above) is preferred. These organopolysiloxanes may be used singly, or two or more having differing degrees of polymerization and molecular structures may be used in combination.

(A-2) Monoalkenyl Di-Terminated Organopolysiloxane Gum

The monoalkenyl di-terminated organopolysiloxane gum of component (A-2) has the following average compositional formula (2).

[Chem. 4]

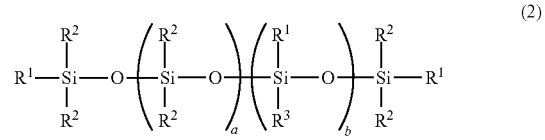

(2)

In formula (2), each $R^1$ is independently an alkenyl group of 2 to 8, and preferably 2 to 6, carbon atoms. Examples of $R^1$ include vinyl, ally, butenyl and hexenyl groups. Of these, vinyl and allyl groups are preferred, and vinyl groups are more preferred. $R^2$ is a group selected from alkyl groups of 1 to 20, preferably 1 to 12, and more preferably 1 to 8, carbon atoms and aromatic hydrocarbon groups of 6 to 20, and preferably 6 to 12, carbon atoms. Examples of the alkyl groups of $R^2$ include alkyl groups such as methyl, ethyl, propyl and butyl groups, and cycloalkyl groups such as the cyclohexyl group; examples of the aromatic hydrocarbon groups include aryl groups such as phenyl and tolyl groups, and aralkyl groups such as the β-phenylpropyl group. Some or all hydrogen atoms bonded to carbon atoms on these groups may be substituted with halogen atoms; such substituted groups are exemplified by the 3,3,3-trifluoropropyl group. Of these, methyl, phenyl and trifluoropropyl groups are preferred, and methyl groups are more preferred. $R^3$ is a group selected from $R^1$ and $R^2$, and is exemplified by the groups mentioned above as examples of $R^1$ and $R^2$. Of these, an organopolysiloxane in which preferably at least 50 mol %, and more preferably at least 80 mol %, of the monovalent hydrocarbon groups represented by $R^2$ and $R^3$ on the molecule are methyl groups and all $R^2$ and $R^3$ groups other than alkenyl groups are methyl groups is especially preferred.

In formula (2), the subscript "a" is an integer from 100 to 100,000, and preferably from 1,000 to 50,000; the subscript "b" is an integer from 1 to 1,000, and preferably from 0 to 500; and a+b is from 100 to 100,000, preferably from 1,000 to 50,000, and more preferably from 2,000 to 20,000. When a+b is within this range, component (A-2) is a gum and can be advantageously used in this invention.

Also, component (A-2) is an organopolysiloxane having an alkenyl group content of from 0.001 to 10 mol %, and preferably from 0.01 to 0.5 mol %.

The organopolysiloxane of component (A-2) is not particularly limited so long as it satisfies the condition for the amount of alkenyl groups per molecule, although a linear diorganopolysiloxane in which the main chain is made up of recurring diorganoalkylsiloxane units (here and below, $R^2_2SiO_{2/2}$, where $R^2$ is the same as above) and both ends of the molecular chain are capped with monoalkenyldialkylsiloxy groups ($R^1_1R^2_2SiO_{1/2}$) is preferred. These organopolysiloxanes may be used singly, or two or more having differing degrees of polymerization and molecular structures may be used in combination.

In this invention, component (A) is characterized by including component (A-1) as an essential ingredient, and preferably uses components (A-1) and (A-2) together. Specifically, components (A-1) and (A-2) are used in such a way that from 0 to 90 parts by weight, and preferably from 0 to 70 parts by weight, of the organopolysiloxane gum serving as component (A-2) is included with respect to from 10 to 100 parts by weight, and preferably from 30 to 100 parts by weight, of the organopolysiloxane gum serving as component (A-1). When component (A-1) and component (A-2) are used together, it is preferable to set the amount of component (A-1) to from 10 to 80 parts by weight, and especially from 10 to 70 parts by weight, and the amount of component (A-2) to from 20 to 90 parts by weight, and especially from 30 to 90 parts by weight. That is, they are used together in such manner that the total amount of components (A-1) and (A-2) is 100 parts by weight. In this way, the cured silicone rubber obtained by curing the composition can be imparted with excellent rubber properties, including elongation at break and tensile set.

These organopolysiloxane gums can generally be obtained by the co-hydrolytic condensation of one, two or more organohalogenosilanes, or by the ring-opening polymerization of a cyclic polysiloxane (e.g., a siloxane trimer or tetramer) using an alkaline or acidic catalyst. These are basically linear diorganopolysiloxanes, but may be partially branched, and may be a mixture of two or more types having different molecular structures.

The organopolysiloxane gums of components (A-1) and (A-2) have average degrees of polymerization that are typically from 100 to 100,000, preferably from 1,000 to 100,000, more preferably from 3,000 to 50,000, and most preferably from 4,000 to 20,000. When the average degree of polymerization is less than 100, the silicone rubber composition ceases to satisfy the properties of a millable rubber and its roll mill kneadability and the like dramatically worsen, which is undesirable. This average degree of polymerization can be determined as the polystyrene-equivalent weight-average degree of polymerization in gel permeation chromatographic (GPC) analysis carried out under the following conditions.

[Measurement Conditions]
 Developing solvent: toluene
 Flow rate: 1 mL/min
 Detector: differential refractive index detector (RI)
 Columns: KF-805L×2 (Shodex)
 Column temperature: 25° C.
 Amount of sample injected: 30μL (toluene solution having a concentration of 0.2 wt %)

[(B) Organohydrogenpolysiloxane]

The organohydrogenpolysiloxane serving as component (B) in the invention is a crosslinking agent for the composition, its purpose being to carry out addition crosslinking reactions with the alkenyl group-containing polysiloxanes of component (A) and thereby give a cured composition.

This organohydrogenpolysiloxane is an organohydrogenpolysiloxane of the average compositional formula (3) below

(wherein each $R^4$ is a like or unlike monovalent hydrocarbon group of 1 to 12 carbon atoms, and p and q are positive numbers which satisfy the conditions 0<p<3, 0<q≤3 and 0<p+q≤3) which has at least two, preferably three or more, more preferably from 3 to 200, and still more preferably from 4 to 100, silicon-bonded hydrogen atoms per molecule.

$R^4$ in formula (3) is exemplified by like or unlike monovalent hydrocarbon groups of 1 to 12, and preferably 1 to 8, carbon atoms. Specific examples include alkyl groups such as methyl, ethyl and propyl groups; cycloalkyl groups such as the cyclohexyl group; aryl groups such as phenyl and tolyl groups; and aralkyl groups such as benzyl, 2-phenylethyl and 2-phenylpropyl groups. Some or all hydrogen atoms on these groups may be substituted with halogen atoms; such substituted groups are exemplified by the 3,3, 3-trifluoropropyl group. Of these, methyl, phenyl and 3,3, 3-trifluoropropyl groups are preferred, and methyl groups are more preferred. Also, it is preferable that an alkenyl group not be included as $R^4$.

Moreover, p and q are positive numbers which satisfy the following conditions: 0<p<3, preferably 0.5≤p≤2.2, and more preferably 1.0≤p≤2.0; 0<q≤3, preferably 0.002≤q≤1.1, and more preferably 0.005≤q≤1; and 0<p+q≤3, preferably 1≤p+q≤3, and more preferably 1.002≤p+q≤2.7.

The structure of the organohydrogenpolysiloxane may be linear, cyclic, branched or a three-dimensional network structure. The hydrosilyl groups may be situated at the ends of the molecular chain, partway along the molecular chain, or in both places.

This organohydrogenpolysiloxane preferably has a viscosity at 25° C., as measured with a rotational viscometer by the method described in JIS K 7117-1:1999, of from 0.5 to 10,000 mPa·s, especially from 1 to 300 mPa·s.

Examples of such organohydrogenpolysiloxanes include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, methylhydrogensiloxane-dimethylsiloxane cyclic copolymers, methylhydrogenpolysiloxane capped at both ends with trimethylsiloxy groups, dimethylsiloxane-methylhydrogensiloxane copolymers capped at both ends with trimethylsiloxy groups, dimethylpolysiloxane capped at both ends with dimethylhydrogensiloxy groups, dimethylsiloxane-methylhydrogensiloxane copolymers capped at both ends with dimethylhydrogensiloxy groups, methylhydrogensiloxane-diphenylsiloxane copolymers capped at both ends with trimethylsiloxy groups, methylhydrogensiloxane-diphenylsiloxane-dimethylsiloxane copolymers capped at both ends with trimethylsiloxy groups, methylhydrogensiloxane-methylphenylsiloxane-dimethylsiloxane copolymers capped at both ends with trimethylsiloxy groups, methylhydrogensiloxane-dimethylsilane-diphenylsiloxane copolymers capped at both ends with dimethylhydrogensiloxy groups, methylhydrogensiloxane-dimethylsiloxane-methylphenylsiloxane copolymers capped at both ends with dimethylhydrogensiloxy groups, copolymers consisting of $(CH_3)_2HSiO_{1/2}$ units, $(CH_3)_3SiO_{1/2}$ units and $SiO_{4/2}$ units, copolymers consisting of $(CH_3)_2HSiO_{1/2}$ units and $SiO_{4/2}$ units, copolymers consisting of $(CH_3)_2HSiO_{1/2}$ units, $SiO_{4/2}$ units and $(C_6H_5)_3SiO_{1/2}$ units, and any of the foregoing compounds in which some or all of the methyl groups are substituted with other alkyl groups, phenyl groups or the like.

The content of the organohydrogenpolysiloxane is such that the amount of hydrosilyl groups on component (B) per mole of the total amount of alkenyl groups in component (A) is from 0.5 to 10 moles, and preferably from 0.7 to 5.0 moles. At less than 0.5 mole, crosslinking may be inadequate and a sufficient mechanical strength may not be obtained; at more than 10, the physical properties after curing may decrease and the compression set may become large. Taking the foregoing into account, it is preferable to use the organohydrogenpolysiloxane within a range of from 0.1 to 40 parts by weight per 100 parts by weight of the alkenyl group-containing organopolysiloxanes of component (A).

[(C) Carbon Black]

The carbon black serving as component (C) is an ingredient for increasing the dielectric constant of the millable silicone rubber composition of the invention, and moreover is a carbon black which is characterized in that it does not decrease the dielectric breakdown strength (BDV). The carbon black (C) has an average primary particle size which must be from 100 to 350 nm, and is preferably from 110 to 300 nm. In addition, it has a DBP oil absorption that is preferably from 30 to 60 mL/100 g, and more preferably from 30 to 50 mL/100 g. Component (C) may be selected from thermal carbons and furnace carbons; one type may be used alone, or two or more types may be used together.

Such a carbon black is not particularly limited as to its shape, so long as the average primary particle size is within the above range, and may be granular or may be powdery. In addition, when a platinum family metal catalyst is used as the subsequently described component (E), desulfurized carbon black may be used in order to prevent curing from being hindered.

As used herein, "average primary particle size" refers to a value measured with a transmission electron microscope, and "DBP oil absorption" refers to a value measured by the method specified in JIS K 6217-4:2008.

So long as it has the above-indicated average primary particle size, a commercial product may be used as the carbon black serving as component (C). Illustrative examples include Thermax N990, Thermax N990 Ultra Pure, Thermax N991 Powder, Thermax N991 Powder Ultra Pure, Thermax N908 Stainless Powder and Thermax N908 Stainless Powder Ultra Pure (all available from CanCarb Inc.); and Asahi #8 and Asahi #15 (from Asahi Carbon Co., Ltd.).

The carbon black (C) is included in an amount, per 100 parts by weight of the organopolysiloxane gums serving as component (A), of from 50 to 100 parts by weight, preferably from 55 to 90 parts by weight, and more preferably from 60 to 80 parts by weight. When this amount is less than 50 parts by weight, the high dielectric constant that is desired may not be obtained; when it exceeds 100 parts by weight, the volume resistivity decreases, the composition becomes electrically conductive, the dielectric breakdown strength (BDV) greatly decreases and the dielectric loss tangent becomes too high, as a result of which the reliability of the high dielectric rubber layer obtained by curing the composition ends up greatly declining. Moreover, mechanical properties such as the elongation at break and the tensile set of the cured silicone rubber obtained by curing the composition may become inadequate.

[(D) Reinforcing Fumed Silica]

The reinforcing fumed silica serving as component (D) is a substance which acts as a filler that imparts excellent mechanical properties to the millable silicone rubber composition of the invention, and which has numerous silanol (SiOH) groups on the surface. The reinforcing fumed silica of component (D) has a BET specific surface area which must be at least 50 $m^2/g$, and is preferably from 100 to 400 $m^2/g$. When this specific surface area is less than 50 $m^2/g$, the reinforcing effect by component (D) may be inadequate.

The reinforcing fumed silica (D) may be used in an untreated state or, if necessary, may be used after surface treatment with an organosilicon compound such as an organopolysiloxane, organopolysilazane, chlorosilane or alkoxysilane. From the standpoint of uniform dispersion of the carbon black and the fumed silica, it is preferable to use reinforcing fumed silica that has been surface-treated beforehand with an organosilicon compound. This makes it possible to suppress decreases in the volume resistivity and dielectric breakdown strength (BDV) and an increase in the dielectric loss tangent even when a high content of the carbon black serving as (C) is included. Component (D) may be of one type used alone, or two or more types may be used together.

A commercial product may be used as the reinforcing fumed silica (D). Illustrative examples include the following non-surface-treated or surface-hydrophobized (i.e., hydrophilic or hydrophobic) fumed silicas: the Aerosil series such as Aerosil 130, Aerosil 200, Aerosil 300, Aerosil R-812, Aerosil R-972 and Aerosil R-974 (from Nippon Aerosil Co., Ltd.); Cabosil MS-5 and MS-7 (from Cabot Corporation); and Reolosil QS-102, 103 and MT-10, as well as Reolosil DM-20S and Reolosil DM-30S (from Tokuyama Corporation). A surface-treated hydrophobic fumed silica is especially preferred.

The content of the reinforcing fumed silica (D) per 100 parts by weight of the organopolysiloxanes serving as components (A) and (B) is from 5 to 100 parts by weight, preferably from 10 to 80 parts by weight, and more preferably from 15 to 70 parts by weight. When this content falls outside of the above range, not only does the processability of the resulting silicone rubber composition decrease, the mechanical properties of the cured silicone rubber obtained by curing this silicone rubber composition, such as tensile strength and tear strength, are inadequate.

[(E) Platinum Family Metal Catalyst]

The platinum family metal catalyst is a catalyst which promotes a hydrosilylation addition reaction between alkenyl groups on component (A) and silicon-bonded hydrogen atoms (SiH groups) on the organohydrogenpolysiloxane serving as component (B). Platinum family metal catalysts include uncombined platinum family metals and platinum family metal compounds. Platinum family metal catalysts that are hitherto known as catalysts for addition reaction-curable silicone rubber compositions may be used. Illustrative examples include platinum catalysts such as particulate platinum metals adsorbed onto a support such as silica, alumina or silica gel, platinic chloride, chloroplatinic acid and alcohol solutions of chloroplatinic acid hexahydrate, as well as palladium catalysts and rhodium catalysts. Platinum or a platinum compound (platinum catalyst) is preferred.

This catalyst should be added in an amount that can promote the addition reaction. In general, the catalyst is used in an amount which, based on the weight of platinum family metal, falls in the range of from 1 ppm by weight to 1% by weight relative to the alkenyl group-containing organopolysiloxanes serving as component (A), with an amount in the range of 10 to 500 ppm by weight being preferred. When the amount of this catalyst added is less than 1 ppm by weight, the addition reaction may not be fully promoted and curing may be inadequate. On the other hand, when the amount added exceeds 1% by weight, further addition beyond this level has little influence on the reactivity and may be uneconomical.

[(F) Dispersing Agent for Filler]

In this invention, in addition to above components (A) to (E), where necessary, (F) a filler dispersing agent may be used as a dispersing agent for the reinforcing fumed silica serving as component (D). The filler dispersing agent (F) is exemplified by various alkoxysilanes, phenyl group-containing alkoxysilanes and hydrolyzates thereof, diphenylsilanediols, carbon-functional silanes, silanol group-containing low-molecular-weight siloxanes and organopolysiloxanes capped at both ends with silanol groups.

When component (F) is used, the amount thereof per 100 parts by weight of the alkenyl group-containing organopolysiloxane gum serving as component (A) is preferably from 0.1 to 50 parts by weight, and more preferably from 1 to 20 parts by weight. When too little is used, the effects of addition may not be observable; when too much is used, the plasticity of the compound may become too low, as a result of which, in a kneading means such as a roll mill, sticking of the compound to the rolls may arise, adversely affecting the workability of the compound with rolls.

[Other Ingredients]

In addition to the above ingredients, fillers and additives known to heat-curable silicone rubber compositions may be optionally added as other ingredients to the millable silicone rubber composition of the invention within ranges that do not detract from the objects of the invention. Such other ingredients are exemplified by fillers such as ground quartz, diatomaceous earth and calcium carbonate, colorants, tear strength enhancers, heat resistance enhancers, flame retardancy enhancers such as platinum compounds, acid acceptors, thermal conductivity enhancers such as alumina and silicon nitride, and mold parting agents. These other ingredients may be of one type used alone or two or more types may be used together.

The millable silicone rubber composition of the invention can be obtained by mixing the ingredients making up the composition in a known mixing apparatus such as a kneader, a Banbury mixer or a two-roll mill. In cases where a composition containing above components (A) to (E) is obtained as the silicone rubber composition, it is preferable to mix together (A) the alkenyl group-containing organopolysiloxane gums and (D) the reinforcing fumed silica so as to give a mixture, and then mix therein (C) the carbon black and subsequently add (B) the organohydrogenpolysiloxane and (E) the platinum family metal catalyst. In cases where other ingredients are also included in the composition containing components (A) to (E), it is preferable to mix together (A) the alkenyl group-containing organopolysiloxane gums, (C) the carbon black, (D) the reinforcing fumed silica and the other ingredients so as to give a mixture, and then add (B) the organohydrogenpolysiloxane and (E) the platinum family metal catalyst to this mixture.

A known method may be selected according to the shape and size of the target molded article as the method of forming/molding the millable silicone rubber composition of the invention. Examples of such methods include casting, compression molding, injection molding, calendering and extrusion.

In this molding/forming method, the curing conditions may be known conditions for the particular method used, and are generally a temperature of from 60 to 450° C. and a period of from several seconds to about one day. In addition, a post-cure (secondary cure) may be carried out in an oven at 200° C. or more, preferably from 200 to 250° C., for a period of at least 1 hour, preferably from about 1 hour to about 70 hours, and more preferably from 1 to 10 hours, for such purposes as to lower the tensile set and compression set of the resulting cured silicone rubber and to reduce the low-molecular-weight siloxane ingredients remaining therein.

The cured silicone rubber obtained by the above molding/forming method has, in the subsequently described measurement method, a dielectric constant that is preferably at least 10, more preferably from 10 to 50, and even more preferably from 11 to 30. At a dielectric constant below 10, the field relaxation effect that disperses the electrical field which has concentrated at the end of a high-voltage power cable may be inadequate. On the other hand, at a dielectric constant greater than 50, the cured silicone rubber starts to become electrically conductive and is unable to maintain sufficient insulating properties, as a result of which dielectric breakdown may arise due to concentration of the electrical field. Also, the volume resistivity is preferably from $1.0 \times 10^{13}$ to $1.0 \times 10^{17}$ Ω·cm, more preferably from $1.0 \times 10^{13}$ to $5.0 \times 10^{16}$ Ω·cm, and even more preferably from $1.0 \times 10^{14}$ to $1.0 \times 10^{16}$ Ω·cm. At a volume resistivity below $1.0 \times 10^{13}$ Ω·cm, the insulating properties are inadequate, as a result of which dielectric breakdown may occur due to concentration of the electrical field. At a volume resistivity greater than $1.0 \times 10^{17}$ Ω·cm, the desired high dielectric properties cannot be obtained. Moreover, in the subsequently described method of measurement, the dielectric breakdown strength (BDV) is preferably at least 7 kV/mm, more preferably at least 7.5 kV/mm and even more preferably at least 8 kV/mm. When the dielectric breakdown strength (BDV) is less than 7 kV/mm, the cured silicone rubber is unable to withstand electric field concentration at an intermediate joint or termination on a high-voltage power cable, which may result in short circuiting, heat generation and combustion or breakdown.

In cases where the cured silicone rubber satisfies all of these conditions, electrical stresses (electric lines of force) are uniformly dispersed without concentrating at the joint, resulting in relaxation of the electrical field. Therefore, deterioration of the cable insulation by electrical stress is reduced and the electrical properties of the cable are stably maintained for a long period of time.

In addition, the cured silicone rubber has an elongation at break, as measured by the method described in JIS K 6249:2003, of preferably at least 450%, more preferably at least 480%, and most preferably at least 500%. At an elongation at break of less than 450%, the cured silicone rubber may end up breaking during dilation when used in a cold shrink-type enclosure. Also, the tensile set, as measured under test conditions of 180° C., 22 hours and 100% extension, is preferably 20% or less, more preferably 17% or less, and most preferably 15% or less. When this exceeds 20% under test conditions of 180° C., 22 hours and 100% extension, the silicone rubber has insufficient restorability when the enclosure is made to shrink, resulting in the inclusion of air pockets that can lead to dielectric breakdown of the power cable and reduced adherence to the cable, so that the requisite properties as an electric field relaxation layer are not satisfied. On the other hand, in cases where a cured silicone rubber that fails to satisfy even one of these conditions is used by the cold shrink method as an electric field relaxation layer at an intermediate joint or termination on a power cable, electrical stress (electric lines of force) concentrate in the region of the joint, the outer cable insulation incurs a load and the amount of electrical charge increases, causing partial discharge to arise. When this occurs repeatedly, the insulation resistance in this region gradually declines, accelerating cable deterioration and ultimately leading to dielectric breakdown and shorting of the cable.

EXAMPLES

The invention is illustrated more fully below by way of Examples and Comparative Examples, although the invention is not limited by these Examples.

Example 1

The following were added and mixed together for 2 hours under heating at 170° C. in a kneader to give Base Compound 1: 100 parts by weight of organopolysiloxane gum (A1) consisting of 99.917 mol % of dimethylsiloxane units, 0.033 mol % of trivinylsiloxy units and 0.050 mol % of methylvinylsiloxy units and for which a=5,995 and b=3 in formula (1) above and the average degree of polymerization is about 6,000, 25 parts by weight of hydrophobized fumed silica having a BET specific surface area of 130 m$^2$/g (Aerosil R-972, Nippon Aerosil Co., Ltd.) and, as a dispersant, 2 parts by weight of dimethylpolysiloxane having silanol groups at both ends, an average degree of polymerization of 4 and a viscosity at 25° C. of 15 mPa·s. Next, 57 parts by weight of carbon black having an average primary particle size of 120 nm and a DBP oil absorption of 30 mL/100 g (Asahi #8, from Asahi Carbon Co., Ltd.) was mixed with 127 parts by weight of Base Compound 1 to give Compound I. Finally, 0.46 part by weight of a methylhydrogenpolysiloxane having pendant SiH groups (a dimethylsiloxane-methylhydrogensiloxane copolymer which is capped at both ends with trimethylsiloxy groups and has an average degree of polymerization of 38 and a SiH group content of 0.0074 mol %), 0.18 part by weight of a platinum catalyst (platinum concentration, 1 wt %) and, as a reaction regulator, 0.10 part by weight of ethynylcyclohexanol were mixed together with 184 parts by weight of Compound I, thereby giving Composition 1.

Example 2

Aside from using as component (A) 90 parts by weight of the above organopolysiloxane gum (A1) and 10 parts by weight of an organopolysiloxane gum (A2) consisting of 99.975 mol % of dimethylsiloxane units and 0.025 mol % of dimethylvinylsiloxy units and for which a=5,998 and b=0 in formula (1) above and the average degree of polymerization is about 6,000, Composition 2 was obtained in the same way as in Example 1.

Example 3

Aside from using 25 parts by weight of carbon black having an average primary particle size of 120 nm and a DBP oil absorption of 30 mL/100 g (Asahi #8, from Asahi Carbon Co., Ltd.) and 51 parts by weight of carbon black having an average primary particle size of 280 nm and a DBP oil absorption of 44 mL/100 g (Thermax N990, from CanCarb Inc.) as the carbon black, Composition 3 was obtained in the same way as in Example 1.

Example 4

Aside from using 100 parts by weight of an organopolysiloxane gum (A1-2) consisting of 99.867 mol % of dimethylsiloxane units, 0.033 mol % of trivinylsiloxy units and 0.100 mol % of methylvinylsiloxy units and for which a=5,992 and b=6 in formula (1) above and the average degree of polymerization is about 6,000, and setting the amount of dispersant to 0 part by weight, Composition 4 was obtained in the same way as in Example 3.

Example 5

Aside from using 10 parts by weight of the above organopolysiloxane gum (A1) and 90 parts by weight of an organopolysiloxane gum (A2) consisting of 99.975 mol % of dimethylsiloxane units and 0.025 mol % of dimethylvinylsiloxy units and for which a=5,998 and b=0 in formula (1) above and the average degree of polymerization is about 6,000 as component (A) and using 25 parts by weight of carbon black having an average primary particle size of 120 nm and a DBP oil absorption of 30 mL/100 g (Asahi #8, from Asahi Carbon Co., Ltd.) and 51 parts by weight of carbon black having an average primary particle size of 280 nm and a DBP oil absorption of 44 mL/100 g (Thermax N990, from CanCarb Inc.) as the carbon black, Composition 5 was obtained in the same way as in Example 1.

Comparative Example 1

The following were added and mixed together for 2 hours under heating at 170° C. in a kneader to give Base Compound 5: 50 parts by weight of above organopolysiloxane gum (A2) and 50 parts of an organopolysiloxane gum (A3) consisting of 99.85 mol % of dimethylsiloxane units, 0.125% of methylvinylsiloxane units and 0.025% of dimethylvinylsiloxy units and for which a=5,991 and b=7 in above formula (1) and the average degree of polymerization is about 6,000 as component (A), 25 parts by weight of fumed silica having a BET specific surface area of 200 m$^2$/g (Aerosil 200, Nippon Aerosil Co., Ltd.) and, as a dispersant, 5 parts by weight of a dimethylpolysiloxane having silanol groups at both ends, an average degree of polymerization of 4 and a viscosity at 25° C. of 15 mPa·s. Next, 80 parts by weight of carbon black having an average primary particle size of 280 nm and a DBP oil absorption of 44 mL/100 g (Thermax N990, from CanCarb Inc.) was mixed with 130 parts by weight of Base Compound 5 to give Compound V. Finally, 0.53 part by weight of a methylhydrogenpolysiloxane having pendant SiH groups (a dimethylsiloxane-methylhydrogensiloxane copolymer which is capped at both ends with trimethylsiloxy groups and has an average degree of polymerization of 38 and a SiH group content of 0.0074 mol %), 0.2 part by weight of a platinum catalyst (platinum concentration, 1 wt %) and, as a reaction regulator, 0.11 part by weight of ethynylcyclohexanol were mixed with 210 parts by weight of Compound V, thereby giving Composition 6 in the same way as in Example 1.

Comparative Example 2

The following were added and mixed together for 2 hours under heating at 170° C. in a kneader to give Base Compound 6: 50 parts by weight of above organopolysiloxane gum (A2) and 50 parts of an organopolysiloxane gum (A3) consisting of 99.85 mol % of dimethylsiloxane units, 0.125% of methylvinylsiloxane units and 0.025% of dimethylvinylsiloxy units and having an average degree of polymerization of about 6,000 as component (A), 30 parts by weight of hydrophobized fumed silica having a BET specific surface area of 130 m$^2$/g (Aerosil R-972, Nippon Aerosil Co., Ltd.) and, as a dispersant, 2 parts by weight of a dimethylpolysiloxane having an average degree of polymerization of 4 and a viscosity at 25° C. of 15 mPa·s. Next, 105 parts by weight of carbon black having an average primary particle size of 280 nm and a DBP oil absorption of 44 mL/100 g (Thermax N990, from CanCarb Inc.) was mixed with 132 parts by weight of Base Compound 6 to give Compound VI. Finally, 0.59 part by weight of a methylhydrogenpolysiloxane having pendant SiH groups (a dimethylsiloxane-methylhydrogensiloxane copolymer which is capped at both ends with trimethylsiloxy groups and has an average degree of polymerization of 38 and a SiH group content of 0.0074 mol %), 0.2 part by weight of a platinum catalyst (platinum concentration, 1 wt %) and, as a reaction regulator, 0.12 part by weight of ethynylcyclohexanol were mixed with 237 parts by weight of Compound VI, thereby giving Composition 7 in the same way as in Example 1.

Comparative Example 3

Aside from using (B) a methylhydrogenpolysiloxane having pendant SiH groups as the curing agent and using 1.0 part by weight of 2,5-dimethylbis(2,5-t-butylperoxy)hexane (available under the trade name Perhexa 25B from NOF Corporation) instead of (E) a platinum catalyst, Composition 8 was obtained in the same way as in Example 1.

Comparative Example 4

Aside from using 100 parts by weight of an organopolysiloxane gum (A3) consisting of 99.85 mol % of dimethylsiloxane units, 0.125% of methylvinylsiloxane units and 0.025% of dimethylvinylsiloxy units and having an average degree of polymerization of about 6,000 as the organopolysiloxane, Composition 9 was obtained in the same way as in Example 1.

Comparative Example 5

Aside from using 100 parts by weight of an organopolysiloxane gum (A4) consisting of 99.906 mol % of dimethylsiloxane units and 0.094 mol % of trimethylvinylsiloxy units and for which a=5,998 and b=0 in above formula (1) and the average degree of polymerization is about 6,000 as component (A), Composition 10 was obtained in the same way as in Example 1.

Comparative Example 6

Aside from using 102 parts by weight of carbon black having an average primary particle size of 280 nm and a DBP oil absorption of 44 mL/100 g (Thermax N990, from CanCarb Inc.) as the carbon black, Composition 11 was obtained in the same way as in Example 1.

Comparative Example 7

Aside from using 38 parts by weight of carbon black having an average primary particle size of 120 nm and a DBP oil absorption of 30 mL/100 g (Thermax N990, from CanCarb Inc.) as the carbon black, Composition 12 was obtained in the same way as in Example 1.

Comparative Example 8

Aside from using 57 parts by weight of carbon black having an average primary particle size of 80 nm and a DBP oil absorption of 28 mL/100 g (Asahi Thermal, from CanCarb Inc.) as the carbon black, Composition 13 was obtained in the same way as in Example 1.

Various rubber properties (Durometer A hardness, tensile strength, elongation at break, tensile set) were measured using cured rubber test sheets fabricated from the silicone rubber compositions prepared in Examples 1 to 5 and Comparative Examples 1 to 8 (Compositions 1 to 13) in general accordance with JIS K 6249:2003.

(Curing Conditions)

Cured rubber test sheets measuring 100 mm square and having thicknesses of 5 mm, 2 mm and 1 mm were fabricated by press curing the silicone rubber compositions under a molding pressure of 7.8 MPa (80 kgf/cm$^2$) and 120° C. for 10 minutes, followed by a 4-hour post-cure at 200° C. (secondary vulcanization).

[Measurement of Dielectric Constant and Dielectric Loss Tangent]

Square-shaped cured rubber sheets measuring 100 mm on a side and having a thickness of 5 mm were fabricated at a molding temperature of 120° C., a molding pressure of 7.8 MPa (80 kgf/cm$^2$) and a molding time of 10 minutes from each of the silicone rubber compositions prepared in Examples 1 to 5 and Comparative Examples 1 to 8 (Compositions 1 to 13). Secondary vulcanization (post-curing) was then carried out at 200° C. for 4 hours, thereby producing samples for measuring the dielectric constant and the dielectric loss tangent. The dielectric constant and the dielectric loss tangent were measured using an automatic Schering bridge (name of apparatus: DAC-IM-D1) from Soken Electric Co., Ltd. The electrodes used were a 50 mm diameter main electrode, a 54×80 mm diameter guard electrode and an 80 mm diameter counterelectrode. Measurement was carried out at a frequency of 50 Hz. The measurement at an applied voltage of 500 V was read off.

[Measurement of Volume Resistivity]

Rubber test sheets having a thickness of 1 mm were fabricated under the same curing conditions as the rubber test sheets for measuring rubber properties, and the volume resistivity was measured in general accordance with JIS K 6249:2003.

[Measurement of Dielectric Breakdown Strength (BDV)]

Rubber test sheets having a thickness of 1 mm were fabricated under the same curing conditions as the rubber test sheets for measuring rubber properties, and the dielectric breakdown strength was measured by the method described in JIS K 6249:2003 at a voltage rise rate of 2 kV/s and using Trans Oil A from Showa Shell Sekiyu KK.

The measured values obtained in each of the above tests using the rubber test sheets for Examples 1 to 5 and Comparative Examples 1 to 8 are presented in Tables 1 and 2.

TABLE 1

| | | Example | | | | | Comparative Example |
|---|---|---|---|---|---|---|---|
| | | 1 | 2 | 3 | 4 | 5 | 1 |
| Ingredients (pbw) | | | | | | | |
| (A-1) Organopolysiloxane | Organopolysiloxane (A1) | 100 | 90 | 100 | | 10 | |
| | Organopolysiloxane (A1-2) | | | | 100 | | |
| (A-2) Organopolysiloxane | Organopolysiloxane (A2) | | 10 | | | 90 | 50 |
| | Organopolysiloxane (A3) | | | | | | 50 |
| Organopolysiloxane (A4) | | | | | | | |
| (B) Organohydrogen-polysiloxane | Methylhydrogenpolysiloxane with pendant SiH groups | 0.46 | 0.46 | 0.45 | 0.45 | 0.45 | 0.53 |
| (C) Carbon black | Asahi #8 | 57 | 57 | 25 | 25 | 25 | |
| | Thermax N990 Ultra Pure | | | 51 | 51 | 51 | 80 |
| | Asahi Thermal | | | | | | |
| (D) Reinforcing fumed silica | Aerosil R-972 | 25 | 25 | 25 | 25 | 25 | |
| | Aerosil R-972 | | | | | | 25 |
| (E) Platinum family metal catalyst | Platinum catalyst (Pt concentration, 1 wt %) | 0.18 | 0.18 | 0.17 | 0.17 | 0.17 | 0.2 |
| Organic peroxide (Perhexa 25B) | | | | | | | |
| Disilanol-terminated dimethylpolysiloxane (average degree of polymerization, 4; viscosity, 15 mPa·s) | | 2 | 2 | 2 | 0 | 2 | 5 |
| Ethynylcyclohexanol | | 0.10 | 0.10 | 0.09 | 0.09 | 0.09 | 0.11 |
| Hardness: Type A | | 45 | 43 | 49 | 55 | 41 | 54 |
| Tensile strength (MPa) | | 7.6 | 7.3 | 7.5 | 7.5 | 6.7 | 6.1 |
| Elongation at break (%) | | 550 | 600 | 500 | 450 | 520 | 430 |
| Dielectric constant | | 13.6 | 13.9 | 15.1 | 15.1 | 13.2 | 12.1 |
| Volume resistivity ($\Omega \cdot cm$) | | $4.5 \times 10^{15}$ | $2.3 \times 10^{15}$ | $2.0 \times 10^{15}$ | $2.0 \times 10^{15}$ | $2.2 \times 10^{15}$ | $1.7 \times 10^{15}$ |
| Dielectric loss tangent | | 0.04 | 0.03 | 0.07 | 0.07 | 0.07 | 0.07 |
| Dielectric breakdown strength (kV/mm) | | 8 | 8 | 7 | 7 | 7 | 8 |
| Tensile set (%) | | 12 | 16 | 13 | 14 | 19 | 11 |

TABLE 2

| | | Comparative Example | | | | | | |
|---|---|---|---|---|---|---|---|---|
| | | 2 | 3 | 4 | 5 | 6 | 7 | 8 |
| Ingredients (pbw) | | | | | | | | |
| (A-1) Organopolysiloxane | Organopolysiloxane (A1) | | 100 | | | 100 | 100 | 100 |
| | Organopolysiloxane (A1-2) | | | | | | | |
| (A-2) Organopolysiloxane | Organopolysiloxane (A2) | 50 | | | | | | |
| | Organopolysiloxane (A3) | 50 | | 100 | | | | |
| Organopolysiloxane (A4) | | | | | 100 | | | |
| (B) Organohydrogen-polysiloxane | Methylhydrogenpolysiloxane with pendant SiH groups | 0.59 | | 0.46 | 0.46 | 0.58 | 0.42 | 0.46 |
| (C) Carbon black | Asahi #8 | | | 57 | 57 | 57 | | 38 |
| | Thermax N990 Ultra Pure | 105 | | | | | 102 | |
| | Asahi Thermal | | | | | | | 57 |
| (D) Reinforcing fumed silica | Aerosil R-972 | 30 | | 25 | 25 | 25 | 25 | 25 |
| | Aerosil 200 | | | | | | | |
| (E) Platinum family metal catalyst | Platinum catalyst (Pt concentration, 1 wt %) | 0.2 | | 0.18 | 0.18 | 0.22 | 0.16 | 0.18 |
| Organic peroxide (Perhexa 25B) | | | 1.0 | | | | | |
| Disilanol-terminated dimethylpolysiloxane (average degree of polymerization, 4; viscosity, 15 mPa·s) | | 2 | 2 | 2 | 2 | 2 | 2 | 2 |
| Ethynylcyclohexanol | | 0.12 | | 0.10 | 0.10 | 0.12 | 0.09 | 0.1 |
| Hardness: Type A | | 53 | 50 | 49 | 36 | 54 | 40 | 45 |
| Tensile strength (MPa) | | 6.6 | 7.0 | 6.4 | 7.1 | 7.0 | 7.6 | 6.6 |
| Elongation at break (%) | | 370 | 420 | 420 | 800 | 340 | 620 | 550 |
| Dielectric constant | | 15.6 | 73.8 | 23.8 | 13.7 | 17.7 | 7.3 | 55.1 |
| Volume resistivity ($\Omega \cdot cm$) | | $3.0 \times 10^{15}$ | $1.1 \times 10^{9}$ | $9.9 \times 10^{15}$ | $2.6 \times 10^{15}$ | $9.9 \times 10^{14}$ | $5.3 \times 10^{15}$ | $1.2 \times 10^{10}$ |
| Dielectric loss tangent | | 0.06 | 0.47 | 0.07 | 0.05 | 0.13 | 0.007 | 0.28 |
| Dielectric breakdown strength (kV/mm) | | 9 | 3 | 7 | 7 | 7 | 16 | 4 |
| Tensile set (%) | | 23 | 28 | 14 | 30 | 13 | 12 | 19 |

The invention claimed is:

1. A millable silicone rubber composition comprising:
   (A) an alkenyl group-containing organopolysiloxane gum consisting of components (A-1) and (A-2) below in a total amount of 100 parts by weight
      (A-1) 10 to 100 parts by weight of an organopolysiloxane gum of average compositional formula (1) below which is capped at both ends of the molecular chain with trialkenylsiloxy groups and has an alkenyl group content of 0.25 mol % or less of the total silicon-bonded substituents $R^1$, $R^2$ and $R^3$ of the formula

[Chem. 1]

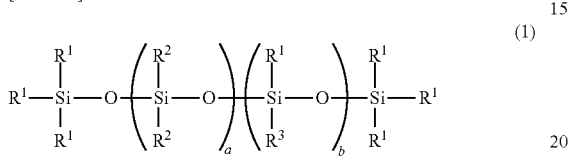
   (1)

(wherein each $R^1$ is a like or unlike alkenyl group of 2 to 8 carbon atoms, each $R^2$ is a like or unlike group selected from the group consisting of alkyl groups of 1 to 20 carbon atoms and aromatic hydrocarbon groups of 6 to 20 carbon atoms, each $R^3$ is a like or unlike group selected from $R^1$ and $R^2$, the subscript "a" is an integer from 100 to 100,000, the subscript "b" is an integer from 1 to 10, and the sum a+b is from 101 to 100,000)
   (A-2) from 0 to 90 parts by weight of an organopolysiloxane gum of average compositional formula (2) below which is capped at both ends of the molecular chain with monoalkenyldialkylsiloxy groups and has an alkenyl group content of from 0.001 to 10 mol % of the total silicon-bonded substituents $R^1$, $R^2$ and $R^3$ of the formula

[Chem. 2]

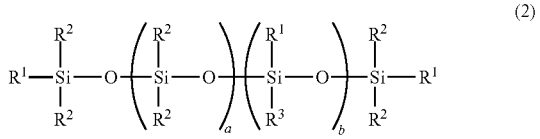
   (2)

(wherein $R^1$, $R^2$ and $R^3$ are the same as above, the subscript "a" is an integer from 100 to 100,000, the integer "b" is an integer from 0 to 1,000, and the sum a+b is from 100 to 100,000);
   (B) an organohydrogenpolysiloxane of average compositional formula (3) below which has at least two silicon-bonded hydrogen atoms per molecule

   $R^4{}_p H_q SiO_{(4-p-q)/2}$, (3)

(wherein each $R^4$ is a like or unlike monovalent hydrocarbon group of 1 to 12 carbon atoms, and p and q are positive numbers which satisfy the conditions $0<p<3$, $0<q\leq3$ and $0<p+q\leq3$), in an amount corresponding to from 0.5 to 10 moles of hydrosilyl groups in component (B) per mole of the total amount of alkenyl groups in component (A);
   (C) from 50 to 100 parts by weight of carbon black having an average primary particle size of from 100 to 350 nm;
   (D) from 5 to 100 parts by weight of a reinforcing fumed silica having a specific surface area as measured by the BET adsorption method of at least 50 m²g; and
   (E) a platinum family metal catalyst in an amount, based on the weight of the platinum family metal, of from 1 ppm by weight to 1 wt % relative to the organopolysiloxane of component (A).

2. The millable silicone rubber composition of claim 1, wherein the carbon black (C) has a DBP oil absorption of from 30 to 60 mL/100 g.

3. The millable silicone rubber composition of claim 1 or 2, wherein component (D) is a hydrophobic fumed silica.

4. The millable silicone rubber composition of claim 1 which, in a cured form thereof, is suitable for use as a cold-shrink rubber member for voltage cables.

5. An electric field relaxation layer in a power cable intermediate joint or termination, which layer comprises a cured form of the millable silicone rubber composition of claim 1, the cured form having, as measured by the methods described in JIS K 6249:2003, a dielectric constant of at least 10, a volume resistivity of from $1.0\times10^{13}$ to $1.0\times10^{17}$ Ω·cm, a dielectric loss tangent of 0.1 or less, a dielectric breakdown strength (BDV) of 7 kV/mm or more, an elongation at break of at least 450% and a tensile set, measured under test conditions of 180° C., 22 hours and 100% extension, of 20% or less.

* * * * *